United States Patent [19]

Siebert

[11] Patent Number: 4,961,805
[45] Date of Patent: Oct. 9, 1990

[54] A METHOD FOR SEVERING AND SEALING SECTIONS OF MATERIAL

[75] Inventor: Lester D. Siebert, Carbondale, Ill.

[73] Assignee: Com-Pac International, Inc., Centralia, Ill.

[21] Appl. No.: 353,041

[22] Filed: May 17, 1989

Related U.S. Application Data

[63] Continuation of Ser. No. 223,379, Jul. 25, 1988, Pat. No. 4,856,989.

[51] Int. Cl.$^5$ .............................................. B32B 31/18
[52] U.S. Cl. .................................... 156/251; 156/515; 423/59; 423/225; 423/226
[58] Field of Search ................. 156/251, 515; 432/225, 432/226, 59

[56] References Cited

U.S. PATENT DOCUMENTS

| | | | |
|---|---|---|---|
| 2,435,923 | 2/1948 | Hess | 432/225 |
| 3,790,992 | 2/1974 | Herz | 156/251 |
| 3,846,620 | 9/1974 | Howard | 156/502 |
| 3,847,711 | 11/1974 | Howard | 156/515 |
| 3,986,914 | 11/1976 | Howard | 156/251 |
| 3,988,184 | 10/1976 | Howard | 156/66 |
| 4,175,994 | 11/1979 | Norton et al. | 156/251 |
| 4,304,615 | 12/1981 | Siegel | 156/251 |
| 4,515,562 | 5/1985 | Williams | 432/225 |
| 4,549,866 | 10/1985 | Granville | 432/10 |
| 4,580,972 | 4/1986 | Hsiung | 432/10 |
| 4,673,122 | 1/1987 | Dubey | 432/225 |
| 4,687,532 | 8/1987 | Johnson | 156/251 |
| 4,812,192 | 3/1989 | Woods et al. | 156/251 |

Primary Examiner—Caleb Weston
Attorney, Agent, or Firm—Jones, Tullar & Cooper

[57] ABSTRACT

A preheater assembly for softening a selected portion of plastic stock material prior to severing and edge sealing is disclosed. The preheater assembly includes a pair of opposed preheaters, each having a heater tip connected to a source of heated air. The air flows through the tip to maintain it at a preselected temperature. The preheaters are mounted on opposite sides of the stock material for motion toward the material to engage it on opposite sides to heat and soften it, and away from the material to release it. Clamp elements engage the stock material during the heating and softening process.

6 Claims, 3 Drawing Sheets

A METHOD FOR SEVERING AND SEALING SECTIONS OF MATERIAL

This is a continuation of co-pending application Ser. No. 07/223,379 filed on July 15, 1988, now U.S. Pat. No. 4,856,989.

BACKGROUND OF THE INVENTION

The present invention relates in general, to the manufacture of a fluid-tight plastic container of the type formed from a sheet of plastic stock material carrying an interlocking closure strip which forms a fastener long the top edge, for opening and resealing the container. More particularly, the invention relates to a preheater assembly for softening the interlocking closure strip prior to severing and heat sealing the edges of bags formed from a supply of stock material.

The stock material from which such containers are formed is described in U.S. Pat. No. 8,988,184, issued Oct. 26, 1976. As therein disclosed, the stock material may be produced by folding a plastic sheet lengthwise. The folded sheet is continuously fed to a welding station where the opposed edges are joined to the two interlocking halves of a plastic closure strip. Each half of the strip is formed with a flange for use in securing the strip to the longitudinal edges of corresponding sides of the folded sheet. The fastener strip is fed from a supply reel and is aligned with the edges to which it is to be secured, and the aligned parts are then fed through a welding station where they are secured in a continuous sealing operation. The resulting stock material is then stored on a reel for later use in producing individual containers.

Another technique for manufacturing the stock material is to extrude the closure strip halves with the web, as the web is manufactured, thus avoiding the need to weld the closure strip in a separate process.

An alternative form of manufacturing the stock material is described in copending U.S. application Ser. No. 07/217,854 of Lester D. Siebert, entitled "Sealing Head For Plastic Film" and filed on July 12, 1988, which application is assigned to the assignee herein. In that copending application, the plastic sheet or web is fed into a welding station unfolded, and is aligned in the station with the two halves of the closure strip. As set forth in that application, two or more closure strips can be applied to the plastic web, depending upon the style and construction of the container to be formed. The halves of the closure strips are held in alignment with the plastic web and are fed through sealing stations, each of which has a sealing head which corresponds to one of the closure strip halves. The sealing heads heat the corresponding strips and the web as the aligned parts pass under the sealing head, so that a thin strip of the plastic is melted and the parts are welded together. Thereafter, the plastic web with the attached closure strip halves is folded and the interlocking closure strip halves are pressed together to provide an elongated folded plastic web secured, for example, at its longitudinal edges by a closure strip. This stock material is then wound on a storage reel for later formation of individual containers.

As described in U.S. Pat. No. 3,847,711, issued Nov. 12, 1974, the stock material formed in either of the two methods described above is formed into individual containers by means of a heated cutting assembly which includes a pressure/cutting bar arranged for reciprocal movement into and out of contact with the stock material. The material rests on a cooperating surface such as a sealing bar, or anvil, which also applies heat to the stock material. The material moves intermittently across the anvil, periodically stopping to allow the pressure/cutting bar to move down against against the anvil to sever the web of material and to weld the now-adjoining stock material edges. Thus, the cutting bar cuts laterally across the web of stock material to sever and edge seal individual containers formed from the material.

Although this process and the apparatus for carrying it out has worked well for many years, the speed of operation of the machinery for forming these containers is limited. This is due to the fact that in the region of the interlocking closure strip which forms the fastener, the stock material is much thicker than is the remainder of the web forming the body of the container. For example, the web may be less than 4 mils in thickness and when doubled over, less than 8 mils, whereas the two closure halves may produce a closure up to 50 mils thick. This difference in thickness imposes different heating requirements for different parts of the container stock material. As a result, a choice must be made during the manufacturing process between using a relatively low heat, where production is slowed to insure proper sealing of the fastener ends when a cut is made, without breaking the cutter, or a relatively high heat, which seals the interlocking fastener strips more quickly and securely so that production can be speeded up, but at the same time risks damage to the thinner portions of the web through overheating.

SUMMARY OF THE INVENTION

In accordance with the present invention, the need to choose between a low heat which slows production or a high heat which risks damage to the web material is avoided through the provision of a preheater assembly located upstream of the bag cutter mechanism and arranged to preheat the closure strip in the regions where cuts are to be made. This preheating allows a loWer heat at the cutter bar for cutting and sealing, thereby avoiding damage to the web material, yet provides complete sealing of the ends of the fastener while allowing a relatively high speed of production.

The cutting mechanism as disclosed in U.S. Pat. No. 3,847,711 requires an intermittent feeding of the stock material through the cutting station so that the stock material is stationary during the cutting and edge sealing operation. The stock material is brought to a halt over a heated anvil and a cutter bar having a cutting wire moves downwardly into contact with the material and cuts through the section of the stock material which has been heated by the anvil. The cutter bar applies pressure to the stock material so that the combination of heat and pressure welds the opposed cut edges of the stock material as it is severed. As noted in U.S. Pat. No. 3,847,711, the cutter bar is shaped to control the flow of molten plastic in the region of the fastener to insure a fluid-tight seal at the ends of the fastener. In accordance with the present invention, a preheater assembly is provided adjacent the path of the stock material at a location upstream from the cutting station a distance corresponding to the location of the next cut in the sequence of cuts which are made across the stock material in the manufacture of the containers. The preheater assembly includes a pair of opposed, axially aligned preheater heads, one mounted above the path of the stock material and the other located directly opposite to the first but below the path of the stock material. The preheater heads are mounted for reciprocatory motion toward and away from each other and thus into and out of contact with the top and bottom surfaces, respectively, of the interlocking closure strip secured to the stock material. The preheater assembly also includes a gripper arm which clamps the web in the region of the preheater heads during each pause in the intermittent motion of the web to hold it in position for the preheater heads, which then move into light contact with the region of the closure strip to heat and soften the plastic material in that region. The preheater heads are then moved away from the web and the clamp is released so that the web can be advanced to bring the preheated region into alignment with the anvil and cutter bar at the cutting station before the plastic cools. The web again stops to allow a cut to be made through this preheated portion. At the same time the preheater heads are brought into contact with the fastener at the next location to be cut, and the process continues repetitively.

The preheater assembly comprises a pair of preheater heads, each having a heated, rounded tip which engages the fastener. The tip includes an upper sleeve section which engages the lower end of a heating tube in which is mounted a heater coil. Air under pressure is introduced into the interior of the heating tube, flows down around the coil to the tip, where it circulates in a tip cavity and then exits from a pair of outlets. The floW of air in the cavity maintaIns the tip at a relatively constant, closely controllable temperature so that the fastener region of the stock material can be heated quickly to a softening temperature, without damaging the material of the fastener or of the web. This softening is maintained while the web is moved to the cutting station so that the operation of the cutter is facilitated.

BRIEF DESCRIPTION OF THE DRAWINGS

The foregoing and additional objects, features and advantages of the present invention will become apparent to those of skill in the art from the following detailed description of a preferred embodiment of the invention, taken in conjunction with the accompanying drawings, in which.

DESCRIPTION OF PREFERRED EMBODIMENT

Figure 1:
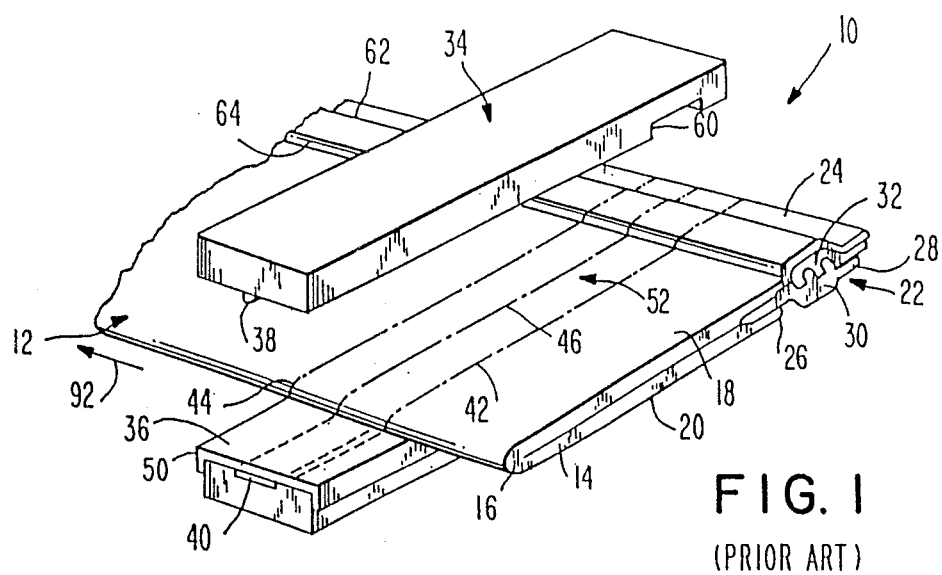
FIG. 1 is a perspective view of a prior art cutter station used to sever a length of stock material into segments.

Turning now to a consideration of FIG. 1, there is illustrated at 10 a heating and cutting station of the type described in U.S. Pat. No. 8,847,711. Supplied to the cutting station is the stock material 12 which is formed by a sheet of plastic film 14 folded longitudinally at 16 to form a container blank having front and back walls 18 and 20, with the fold 16 providing a container bottom. The walls 18 and 20 of the folded film 14 are secured together by a fastener 22 which extends continuously along the length of the folded stock material 12 adjacent the edges 24 and 26 of the sheet 14. The fastener will forms the top of the containers to be cut from the stock material. The edge 24 may extend beyond the fastener 22 to provide a flap which facilitates the opening and closing of the container, with another flap being formed by an extension 28 of the fastener. As illustrated, the fastener 22 is formed from two closure strip halves 30 and 32 which are shaped to interlock with each other in known manner. The closure halves may be welded onto the web 14, or may be formed integrally therewith as by extruding.

By means of a suitable intermittent or continuous feeding device (not shown), predetermined lengths of the folded plastic stock material 12 are fed between the upper and lower jaws 34 and 36 of a cutter/sealer. The upper jaw 34 is a pressure bar which carries a longitudinal cutting wire 38 while the lower jaw is a sealing bar which carries a heating element 40. The cutting wire is aligned with and is parallel to the heating element 40.

At least one of the jaws 34 or 36 is movable With respect to the other so that one moves to press the stock material 12 against the surface of the other. Heat and pressure are thereby applied to the regional area of the folded plastic stock material 12 disposed therebetween, in the region illustrated by the dotted lines 42 and 44. The pressure causes the cutting wire 88 to sever the stock material 12 along the line 46 illustrated in FIG. 1. The heating element 40 may be of the continuously heated type or may be a thermal impulse type and preferably includes a Nichrome heater element protected by a teflon-coated fiberglass cover 60.

In operation, a suitable length of the folded stock material 12 is fed through the cutter station 10 defined by the jaws 34 and 36. The motion of the stock material 12 is stopped as the jaws are closed. The jaw 36 is heated by a current flow through heating element 40 to apply heat to the plastic material between the dotted lines 44 and 42. As the material is heated, the jaws 34 and 36 apply pressure to weld the stock material together in a region between the dotted lines 42 and 44, generally indicated as region 52. While this is occurring, the wire 38 severs the material 12 in the center of the region 52 to separate a container 54 from the stock material 12 while at the same time sealing the container trailing side edge 56 and the leading edge 58 of the remaining stock material (See FIG. 3).

Figure 2:
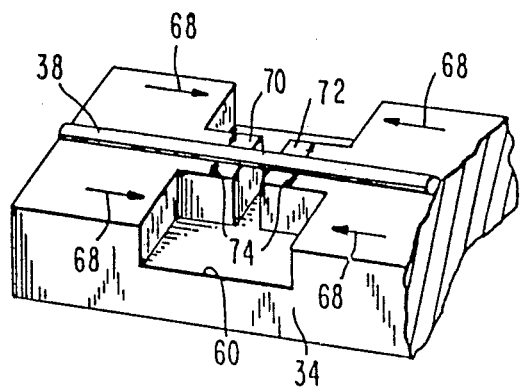
FIG. 2 is an enlarged partial view of a portion of the cutter bar of FIG. 1.

As illustrated in FIG. 2, the jaw 34, which serves as a pressure bar, is provided with a channel 60 which spans the fastener 22. The channel is shaped to snugly straddle and slightly pinch the top and bottom edges 62 and 64 of the fastener portion of the stock material (see FIG. 8). As the heat is supplied by the heating element 40, the pressure bar 34 applies pressure to the area 52, but provides a reduced amount of pressure in the region of channel 60, as indicated by dotted line 66 in FIG. 8. As a result, heated plastic from the part of the regional area which surrounds portion 66 is forced into the channel 60 in the general direction of the arrows 68 illustrated in FIG. 3. This flow of heated plastic forms bead seals at the ends of the fastener 22, in the manner described in detail in the aforesaid U.S. Pat. No. 8,847,711. To provide a more positive flow of melted plastic into the fastener 22, the channel 60 on pressure bar 34 preferably is provided with a pair of inwardly extending land areas 70 and 72 which further compress the molten plastic in the direction of arrows 74 (see FIG. 3) to seal the interface area between the closure strips 30 and 32 so that the ends of the fasteners at the edges 66 and 58 will be fluid tight after the container has been severed from the stock material.

Figure 3:
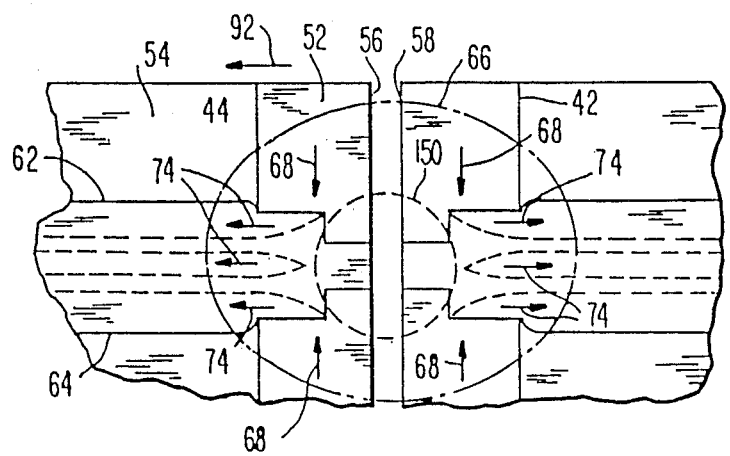
FIG. 3 is an enlarged partial view of the stock material of FIG. 1 after it has been severed.

Because the plastic of the fastener 22 is thick, a considerable amount of heat must be supplied in the region 66 to cause it to flow in the manner illustrated in FIG. 3. As indicated in FIG. 1, the thickness of the fastener is much greater than that of the plastic web 14 on the order of 5-6 times thicker, even when the web is doubled over, and accordingly the heat supplied by the heating element 40 must be applied over a relatively long period of time at a temperature that will not damage the web 14 in order to obtain the desired softening of the fastener 22. This slows down the process of sealing the edges of the container and severing them.

Figure 4:
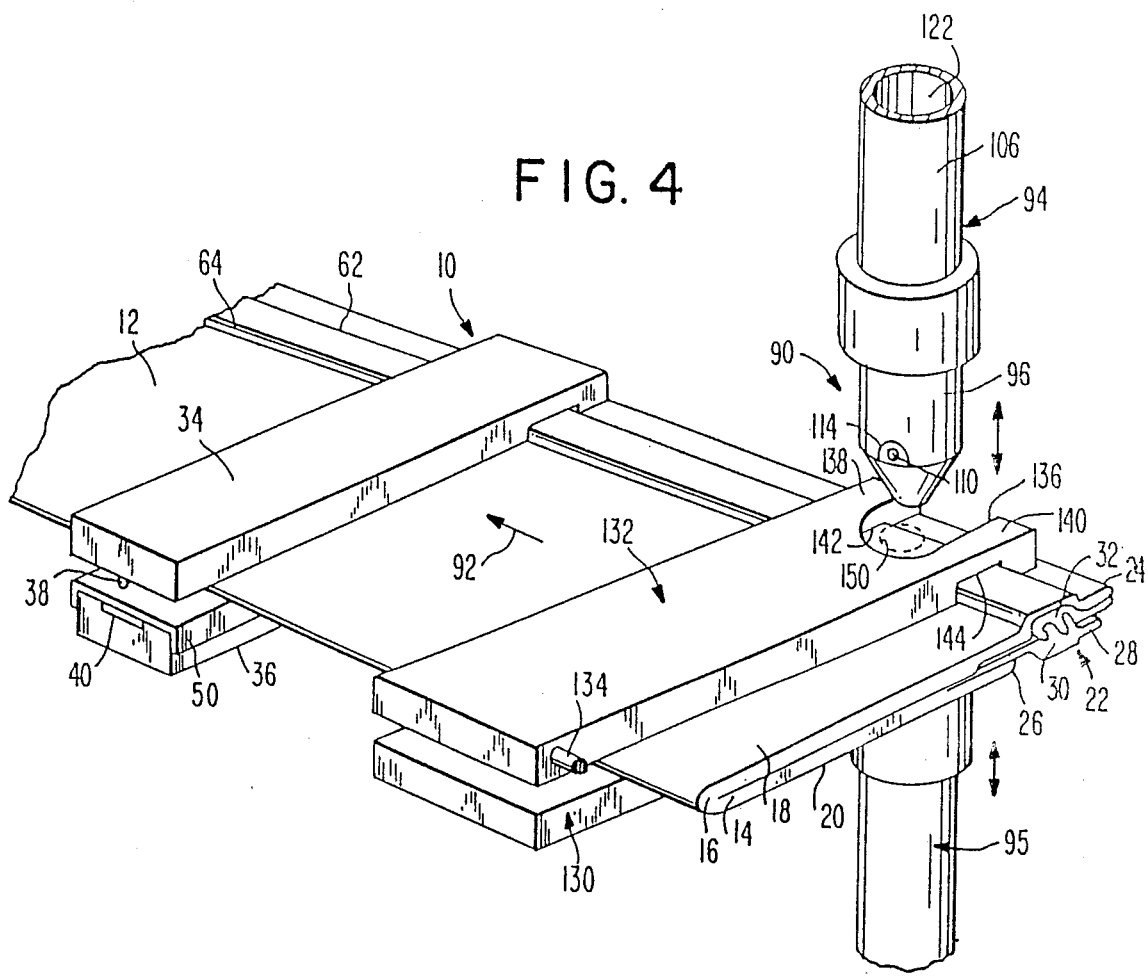
FIG. 4 is a perspective diagrammatic illustration of the cutter station of FIG. 1 in combination with the preheater assembly of the present invention.

To facilitate the formation of bead seals in the manner illustrated in FIG. 3, the present invention provides a preheating station generally indicated at 90 in FIG. 4. This preheating station is located upstream of the cutting station 10 along the path followed by the stock material 12. The stock material is moved intermittently in the downstream direction illustrated by arrow 92 and thus moves from the region of the preheating assembly 90 to the cutting station 10. In FIG. 4, the cutting station is shown in its closed, or pressure position, and elements common to the illustration of FIGS. 1 through 4 are indicated by the same numbers.

Figure 5:
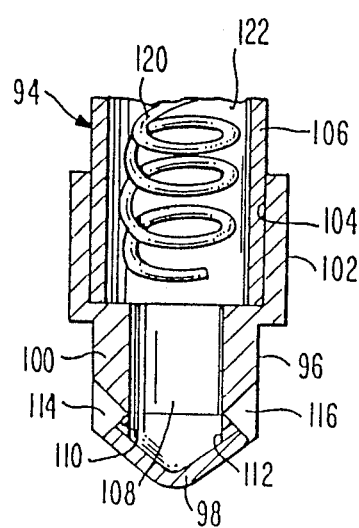
FIG. 5 is a cross sectional view of a preheater tip in accordance with the present invention.

The preheater assembly 90 includes upper and lower preheaters 94 and 95 both having longitudinal axes which are vertically aligned and coaxial with each other, with the upper preheater 94 being positioned above the path of the stock material 12 and the lower preheater 95 being located below the path of the stock material. The preheaters are identical, and will be described in detail with respect to the preheater 94 which is partially shown in cross section in FIG. 5. Thus, preheater 94 incorporates a heating tip 96 having a closed, curved bottom wall 98, a generally cylindrical vertical tip wall 100 and an upper cylindrical sleeve portion 102. The walls 98 and 100 preferably are formed as an integral element with the sleeve portion 102. The sleeve defines a receptacle 104 which receives the lower end of a cylindrical heating tube 106, while the preheating tip 96 defines an interior heating cavity 108 located within the cylindrical portion 100 and the tip portion 98. The lower portion of the cavity 108 incorporates exit ports 110 and 112 which lead through the tip wall 100 of the preheater 94 to form air outlets 114 and 116.

Heater tube 106 carries an interior heating element 120 which may be in the form of an electrically heated coil or other conventional heating element, with the interior 122 of the tube forming an air passageway through which heated air is directed into the cavity 108 and out of the tip 96 by way of passageways 110 and 112. These passageways are angled upwardly and outwardly with respect to the bottom wall 98 so that the air flowing in through the preheater tube 106 will be directed away from the stock material 12 when the preheater assembly is in use. This flow of air through the heater tube 106, through the cavity 108 and out the passageways 110 and 112 promotes a uniform heating of the heating tip 96, and particularly the bottom wall 98, so that it will provide a uniform heating of the fastener element 22 when the tip 96 is brought into contact with the fastener.

Figure 6:
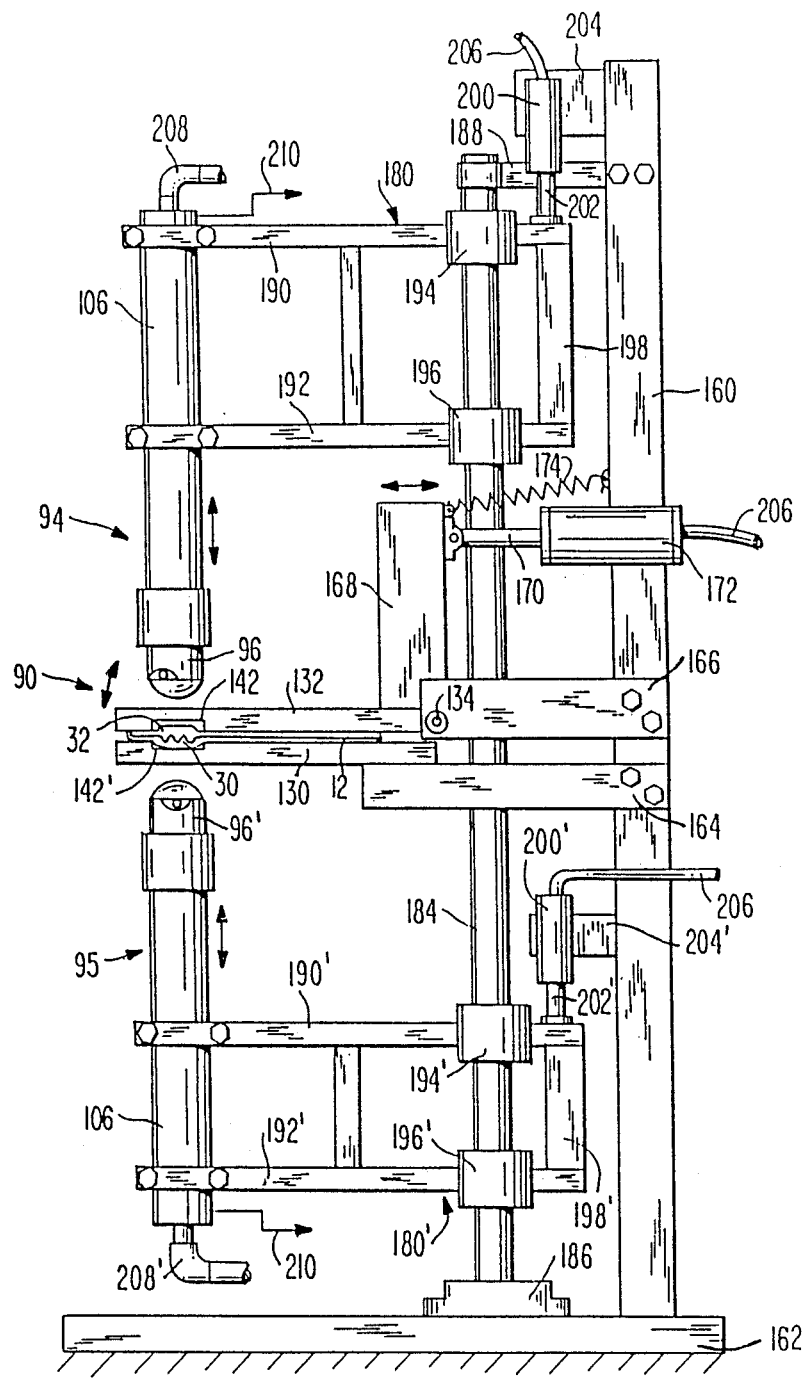
FIG. 6 is a side elevation view of a preheater assembly in accordance with the present invention.

To hold the stock material in position during the preheating step, so that the heating tip 96 and the fastener 22 remain in alignment with each other, a pair of preheater clamping elements 130 and 132 are provided. The lower clamping element 130 preferably is fixed, and serves as a guide and support table, as illustrated in FIG. 6, while the upper clamp element 132 preferably is mounted for pivotal motion about a mounting shaft 134. Each of the lower and upper clamping elements 130 and 132 includes a cutaway portion, indicated at 136 for clamping element 132, to provide access to the fastener element 22 for the preheating tips 96. The clamping element 132 is generally rectangular in cross section, extends across the width of the stock material 12, and is movable to a closed position (illustrated in FIG. 4) to engage the upper surface 18 of the stock material. The cutaway portion 136 provides a bifurcated end portion of element 132 having legs 138 and 140 straddling the preheater tip 96 to allow free motion of the preheater into and out of contact with the stock material. The cutaway portion 136 also provides clearance between the clamping element 132 and the preheater tip to allow pivotal motion of the clamp about shaft 134. The legs 138 and 140 preferably incorporate downwardly opening grooves or channels 142 and 144, respectively, which straddle and receive the enlarged and thickened portion of the stock material produced by the extra thickness of the fastener 22. These channels 142 and 144 serve to locate the fastener with respect to the preheater tips 96 so that when the tip is brought into contact with the upper surface of the fastener, only the region of the fastener 22 generally indicated by the dotted line 150 in FIGS. 3 and 4 will be preheated and softened in preparation for the cutting step which will follow.

Although the area 150 is illustrated as being on the top surface of the stock material 12 as shown in FIG. 4, it will be understood that the lower preheater 95 will similarly preheat a corresponding region on the lower surface of the fastener 22 so that the fastener is heated to the desired temperature substantially completely through its entire thickness. For this purpose, the lower clamping element 130 is similarly shaped to element 132 to straddle the fastener 22 and to allow access by preheater 95 to the lower surface 20 of the stock material. Thus, as illustrated in FIG. 6, in addition to the guide channels 142 and 144 in the upper clamping unit 132, similar channels 142= and 144= may be provided in the lower clamping element 130 to aid in guiding the stock material 12 through the preheating station 90 to the cutting station 10. If desired, one or the other of channels 142, 144 and 142=, 144= can be omitted, depending upon the particular shape of the interlocking fastener 22.

In FIG. 4 the lower clamping element 130 and the anvil 36 are shown as separate elements; however, it will be understood that in a preferred form of the invention, they will be a single support platen for receiving and carrying the stock material 12 through the preheating and cutting stations 90 and 10.

Apparatus for mounting the preheating assembly 90 for reciprocating motion on a vertical axis with respect to the horizontal stock material is illustrated in diagrammatic form in FIG. 6. As there illustrated, the apparatus includes a vertical frame member 160 supported on a base 162. Secured to the vertical frame 160 is a horizontal support arm 164 on which is mounted, as by welding, the lower clamp element 130. As shown, element 130 forms a substantially horizontal support surface for the stock material 12. A pair of spaced horizontal support arms 166 are also supported to frame element 160 at a location above the support arm 164 and extend outwardly to receive the opposite ends of pivot shaft 134 of the upper clamp element 132. A vertical lever arm 168 is secured to the upper surface of clamp element 132 for pivoting the clamp. The upper end of lever arm 168 is connected by way of shaft 170 to a hydraulic cylinder 172 by which the upper end of the lever arm 168 can be pressed forward toward the left as viewed in FIG. 6, to pivot the clamp element 132 in a counterclockwise direction about shaft 134 to grip the stock material 12. Upon releasing the cylinder 172, a bias spring 174 connected between arm 168 and frame member 160 pivots the lever arm 168 in a clockwise direction to release the stock material so that it can be advanced to the cutting station.

The upper and lower preheaters 94 and 95 are mounted in carrier frames 180 and 180=, respectively. Each of these frames is mounted for vertical motion on a vertical shaft 184 supported on the base 162 by means of a mounting bracket 186 and held in its vertical position by means of an upper support bracket 188 connected between the upper end of shaft 184 and frame 160. The carrier frame 180 includes a pair of horizontal arms 190 and 192 which are secured at their outer ends to the heating tube 106 and which incorporate bearings 194 and 196, respectively, for mounting the arms on the vertical shaft 184. The arms 190 and 192 extend beyond the bearings and are rigidly tied together by a vertical carrier frame element 198 so that the carrier rigidly supports the preheater 94. Additional frame elements and braces may be provided as required to insure smooth operation of the carrier frame. The carrier frame 180= is constructed in a similar manner to frame 180, and similar elements are similarly numbered, but primed.

Vertical motion of the carrier frame 180 on vertical shaft 184 is controlled by a hydraulic cylinder 200 connected to the upper frame member 190 by way of a shaft 202. Cylinder 200 is secured to the frame 160, as by a support bracket 204. In similar manner, the motion of carrier frame 180= on shaft 184 is controlled by a hydraulic cylinder 200= connected to the element 190= by way of a shaft 202=. The cylinder 200= is mounted on the frame 160 by way of a support bracket 204=.

Hydraulic fluid is supplied to the various cylinders by way of suitable piping or flexible lines in well known manner to activate the cylinders at desired times. Alternatively, the cylinders may be replaced by electrically operated solenoids, by linear motors, or by other suitable, and well known drive mechanisms.

Air under pressure is supplied to the heating tubes 106 by way of air hoses 208, illustrated in FIG. 6. Electrical poWer is supplied to the heater elements in heating tubes 106 by way of electrical leads 210.

In operation, stock material 12 is supplied to the cutting station 10, in known manner, by way of the preheating station 90 of the present invention. Because the web 14 is only about 3 or 4 mils thick, so that when doubled over it presents a total thickness of about 8 mils, whereas the total thickness of the stock material at the fastener 22 may be as much as 50 mils, heating of the stock material by the heater element 40 is very uneven, and it is easy to overheat the film and damage it while trying to get a proper seal at the fastener as the bags or containers are severed from the supply of stock material. Not only does insufficient heating of the fastener result in a poor seal, but unmelted material can damage the cutter wire as well as the jaws 34 and 36. The preheater assembly 90 avoids this problem by warming the material in the region of the fastener before it is supplied to the cutter station. This preheating softens the thick fastener so that pressure along the length of the pressure bar 34 is equalized. Furthermore, the preheating provides a temperature equalization across the width of the stock material so that it seals more evenly and prevents wrinkling of the material along the length of the severing line. In addition, the preheater reduces the amount of heat required at the cutting station, thus reducing wear and tear on the cutting mechanism and speeding up production without damaging the material.

The stock material passing through the preheater assembly 90 is clamped by the clamping bars 132 and 130 whenever the web stops to permit the cutting assembly to sever and seal a container. When the clamp elements 132 and 130 haVe secured the stock material, the cylinders 200 and 200= are activated to move the preheater tips 96 and 96= into contact with the fastener in the region 150, the preheater tips moving through the cutaway portions of the respective clamp elements.

Air is supplied to the preheaters 94 and 95 by way of lines 208 and 208=, the air flowing downwardly through the heating tubes 106 where it is raised to the desired temperature by the heating coils 120. The air flows down into the cavity 108 where it heats the preheating tip 96 to an even and constantly maintained temperature before exiting through passageways 110 and 112. The film material usually used for the stock material 12 melts at a temperature between 240° and 260°, although it can withstand a temperature of between 300° and 400° for a short time. These higher temperatures can be used to soften the material without melting it, and accordingly a temperature in the range of about 400° is maintained at the tip bottom wall 98. The dwell cycle of the preheater assembly is adjusted to heat the material of fastener 22 essentially completely through, and, depending upon the particular fastener used and the particular material used, this dwell time can be anywhere from 0.5 to 10 seconds. The temperature is lowered and the dwell time is increased for best results, since the longer the dwell time, the more even will be the softening of the fastener. The tips are moved into light contact with the fastener surface, and as the material warms and softens, the tips move into the material a small distance before the cycle ends to retract the preheaters.

At the end of the selected cycle, the cylinders 200 and 200= retract the two preheaters 94 and 95 and the clamp element 132 is released to move away from the surface of stock material 12, allowing the stock material to be advanced to carry the preheated area into the cutting station.

The radius of curvature of the preheating tip wall 98 is determined by the width of the fastener i.e., the distance between edges 62 and 64. This distance is normally about 0.03 inch so the radius is adjusted to provide a contact point between the preheating tip 96 and the fastener which does not extend beyond the edges of the fastener. Although the area of contact is small, some heating will occur outside the region of direct contact, so as a practical matter, the region of preheating identified by the circle 150 is normally about one quarter inch in diameter.

As previously mentioned, the air emitted through the passageways 110 and 112 is angled upwardly away from the surface of the stock material 12 so that the material surrounding the region of contact is not heated.

The heating element 120 is shown for purposes of example; various other heating elements may be used without departing the spirit of the present invention. Thus, for example, a band-type heater element can be connected around the sleeve portion 102 of the preheater head 96 or, alternatively, a heater element can be placed in the cavity 108. However, the illustrated construction is preferred, since it eliminates problems of temperature cycling. With this construction, a large air flow can be provided to maintain a constant temperature on the tip wall 98 even when it comes into contact with the much cooler surface of the stock material. Thus, in accordance with the present invention a relatively large preheater head is utilized to provide a large heat sink so that the film and fastener can be heated rapidly to a controlled temperature level while keeping the overall weight of the device relatively low so that it can be moved toward and away from the film for short dwell cycles.

Although the present invention has been described in terms of a preferred embodiment, it will be apparent that numerous variations and modifications may be made without departing from the true spirit and scope thereof as defined by the following claims.

What is claimed is:

1. A method for severing and edge sealing sections of material from a supply of stock material comprising:
   moving stock material through a preheater station;
   intermittently stopping the stock material in the preheater station;
   clamping the stock material, while stopped, to position it with respect to preheater means in the preheater station;
   moving the preheater means into contact with a portion of the stock material in the preheater station to heat and to thereby soften a portion of the stock material;
   retracting the preheater means and releasing the stock material;
   advancing the preheated and softened portion of the stock material to a cutting and edge sealing station for further heating and severing the stock material through the preheated portion thereof.

2. The method of claim 1, wherein the step of moving the preheater means into contact with a portion of the stock material includes contacting opposing surfaces of the stock material under the preheater means.

3. The method of claim 1, wherein the steps of moving and retracting the preheater means include reciprocating a pair of preheaters toward and away from each other along a common axis, said preheaters being mounted on opposite sides of the stock material for movement into contact with opposing surfaces thereof.

4. The method of claim 3, wherein the steps of clamping and releasing the stock material including mounting clamping means in said preheater station for movement to engage the stock material adjacent the location of the preheater means when said stock material is stopped, and to disengage the stock material upon completion of said heating and softening.

5. The method of claim 4, wherein the step of advancing the preheated and softened portion of the stock material to a cutting and edge sealing station includes stopping the preheated portion in the cutting station in alignment with a cutter;
   clamping the stock material in at least said preheated portion;
   heating the clamped region to seal at least said preheated portion to provide sealed edges for severed portions of the stock material;
   cutting the stock material through the sealed portion of the stock material to sever a section of the stock material; and
   releasing the clamped stock material to permit further advancing thereof.

6. A method for severing and edge sealing stock material to form individual sealable containers, comprising:
   feeding stock material formed from a thin plastic web and carrying interlocking fastener strips through a preheater station and through an adjacent cutting and edge sealing station;
   intermittently stopping the stock material sequentially in the preheater and in the cutting and edge sealing stations;
   clamping the stock material, while stopped, to position the stock material in the preheater station;
   moving preheater means into contact with the fastener strip portion of the stock material in the preheater station to heat and thereby to soften the fastener strip portion;
   retracting the preheater means and releasing the stock material;
   feeding the stock material to advance the preheated and softened portion of the stock material to said cutting and sealing station and aligning the preheated portion with a cutter and heater in said cutting and edge sealing station to sever a container from said web and to sever and seal the fastener strip portion thereof to produce a watertight closure seal on the container and in the fastener portion.

* * * * *